United States Patent
Mattellone

(10) Patent No.: US 9,296,181 B2
(45) Date of Patent: Mar. 29, 2016

(54) MULTI-LAYER MATERIAL AND RELATIVE METHOD OF PRODUCTION

(75) Inventor: Doriano Mattellone, Pavia di Udine (IT)

(73) Assignee: MATTELLONE SRL, Trivignano Udinese (IT)

( * ) Notice: Subject to any disclaimer, the term of this patent is extended or adjusted under 35 U.S.C. 154(b) by 757 days.

(21) Appl. No.: 13/580,317

(22) PCT Filed: Feb. 21, 2011

(86) PCT No.: PCT/IB2011/000342
§ 371 (c)(1),
(2), (4) Date: Aug. 21, 2012

(87) PCT Pub. No.: WO2011/101735
PCT Pub. Date: Aug. 25, 2011

(65) Prior Publication Data
US 2013/0004720 A1    Jan. 3, 2013

(30) Foreign Application Priority Data
Feb. 22, 2010    (IT) .............. UD2010A0032

(51) Int. Cl.
| B32B 3/00 | (2006.01) |
| B32B 3/02 | (2006.01) |
| B32B 15/04 | (2006.01) |
| B32B 21/04 | (2006.01) |
| B32B 21/14 | (2006.01) |
| B32B 15/10 | (2006.01) |
| B32B 15/20 | (2006.01) |

(52) U.S. Cl.
CPC ................ *B32B 15/10* (2013.01); *B32B 15/20* (2013.01); *B32B 2307/51* (2013.01); *B32B 2307/546* (2013.01); *B32B 2309/02* (2013.01); *B32B 2309/105* (2013.01); *B32B 2309/12* (2013.01); *B32B 2311/24* (2013.01); *B32B 2317/16* (2013.01); *B32B 2375/00* (2013.01); *B32B 2479/00* (2013.01); *B32B 2509/00* (2013.01); *Y10T 156/10* (2015.01); *Y10T 156/1062* (2015.01); *Y10T 428/24488* (2015.01)

(58) Field of Classification Search
CPC .............. B32B 1/00; B32B 3/00; B32B 3/02; B32B 3/28; B32B 3/30; B32B 15/00; B32B 15/10; B32B 15/20; B32B 15/04; B32B 15/043; B32B 21/04; B32B 21/00; B32B 21/14; B32B 21/042; B32B 2250/05; B32B 2309/105
USPC ........ 428/57, 157, 172, 192, 457, 535, 537.1; 156/60
See application file for complete search history.

(56) References Cited

U.S. PATENT DOCUMENTS

| 5,026,593 A | 6/1991 | O'Brien |
| 2003/0009976 A1 | 1/2003 | Hauser et al. |

FOREIGN PATENT DOCUMENTS

| DE | 4100043 | 7/1992 |
| DE | 20001432 | 4/2000 |
| GB | 2306389 | 5/1997 |
| IT | 1370285 | 5/2006 |

*Primary Examiner* — Catherine A Simone
(74) *Attorney, Agent, or Firm* — Hamre, Schumann, Mueller & Larson, P.C.

(57) ABSTRACT

Multi-layer material comprising a plurality of wood-based sheets (14) comprising at least a layer (11, 12) of metal material interposed between two wood-based sheets (14).

15 Claims, 3 Drawing Sheets

MULTI-LAYER MATERIAL AND RELATIVE METHOD OF PRODUCTION

FIELD OF THE INVENTION

The present invention concerns a method to make a multi-layer material of the laminated type, and the multi-layer material made using said method.

The invention is able to be used advantageously, but not only, in making objects of various forms, even complex and shaped, and limited sizes, such as for example furnishing ornaments, accessories for the home, gadgets, personal or clothing accessories, such as for example frames for glasses, straps for watches, bracelets or suchlike.

BACKGROUND OF THE INVENTION

Multi-layer materials are known, obtained by assembling together, by gluing, a plurality of layers or sheets of various types of material, even of a different type from layer to layer.

For example, laminated multi-layer materials are known made with a plurality of sheets of non-precious wood, or wood substitute material, glued together and covered externally on at least one side by an enhancing layer.

The enhancing layer is generally made of synthetic resins or metal foils, chosen according to the finish to be obtained.

However, while laminated multi-layer materials with an enhancing layer of synthetic resin can be obtained at reasonable cost, those with an enhancing layer made of metal are much more expensive and are therefore used mainly in the furniture sector, whereas they are rarely used in the gift and fancy goods sector, or for personal accessories or gadgets.

Patent n. IT-B-1370285, in the name of the present Applicant, describes a multi-layer material provided with an internal layer of wood material or wood substitute and one or two enhancing layers, or covering layers, outside the one or more internal layers. The external layers can be made of recycled material deriving from tin or aluminum containers such as boxes, cans or tins or suchlike, or they can be made of industrially produced material.

Other examples of multi-layer materials that incorporate metal layers alternating with layers of wood are described in the documents U.S. Pat. No. 5,026,593, GB-A-2306.389 and US-A1-2003/0009976.

One disadvantage of known multi-layer materials is that, since the layers all have the same length, they do not lend themselves to be easily deformed so as to obtain different objects with the desired curvilinear forms, and also with small sizes. In other words, the constancy of the overall thickness of the multi-layer material does not allow easy bending and shaping operations so as to obtain objects having curved and complex shapes, as in the case for example of frames for glasses. Indeed, an excessive curvature imparted on the material can cause cracks and/or breakages in the internal layers. Furthermore, with time the enhancing layers can lose their adherence to the internal layer with which they are associated: this can occur more probably in the zones of curvature, where the greatest forces and stresses are concentrated.

Purpose of the present invention is to achieve, by means of a simple and economic method, a laminated multi-layer material with enhancing layers that is permanently deformable, preventing the generation of breakages or cracks in the material.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, a multi-layer material according to the present invention comprises a plurality of wood-based sheets, for example real wood or wood substitute material, such as cork, chip or suchlike, or melamine laminates.

The multi-layer material used in the present invention comprises at least a layer of metal material interposed between two wood-based sheets.

In this way, by inserting at least one layer of metal material, for example a metal foil, between two wood-based sheets, it is possible to increase the overall elasticity and deformability of the multi-layer material itself, allowing to at least partly curve the multi-layer material and reducing the possibility of breakages and/or cracks.

According to a variant, the multi-layer material comprises at least two of the layers of metal material. A first layer is interposed between at least two wood-based sheets. A second layer of metal material is in turn interposed between at least two other wood-based sheets.

In this way it is possible to further increase the deformability of the material so as to be able to make objects with various curvilinear forms. Moreover, since the multi-layer material has at least one wood-based sheet disposed externally, it is possible to give the objects made with the multi-layer material according to the present invention a desired aesthetic appearance.

According to another variant, the multi-layer material comprises at least two of the layers of metal material, of which a first layer is interposed between at least two wood-based sheets and a second layer applied externally to one of said wood-based sheets.

According to the present invention, the multi-layer material comprises one or more internal wood-based sheets with respect to other external wood-based sheets. At least one of the internal wood-based sheets has a progressive reduction in thickness until it is cancelled out in a position upstream with respect to the ends of other possible adjacent internal wood-based sheets and of external wood-based sheets, so that the shorter length of said at least one internal wood-based sheets determines a progressive and corresponding variation in the overall thickness in the multi-layer material.

According to a variant, at least one layer of metal material has a progressive reduction in thickness until it is cancelled out in a position upstream with respect to the ends of other possible adjacent internal wood-based sheets and of external wood-based sheets, in this way determining a progressive and corresponding variation in the overall thickness in said multi-layer material.

It also comes within the spirit of the present invention to provide, inside the multi-layer material, a layer of plastic or acetate material which has a shorter length with respect to the length of the wood-based sheets or at least a metal layer adjacent thereto, reducing in thickness until it is cancelled out upstream of their ends, so as to determine a corresponding variation in thickness of the multi-layer material.

The variability in thickness of the multi-layer material, determining a localized variation in the resistance to deformability and bendability, allows to make objects of different types and form, even complex, such as stationery objects, containers for objects, business card holders, or objects for personal use such as frames for glasses, provided with portions having different or variable thickness, for example glasses in which the frames is provided with portions having variable thickness.

Furthermore, the reduction in thickness of one or more of the wood-based sheets facilitates the curving of the multi-layer material especially in the direction of the desired curvilinear development to be made.

The reduction in thickness is also obtained in an extremely simple and economic manner from the production point of view, requiring only the preparation of sheets of different length to be inserted in the multi-layer material.

Moreover, the reduction in thickness is obtained by working on the internal layers of the multi-layer, so that the external aesthetics of the object is in no way jeopardized.

According to some forms of embodiment of the present invention, the at least one layer of metal material is defined by a thin foil of recycled material deriving from tin or aluminum containers, such as tins or cans or suchlike.

According to other forms of embodiment of the present invention, the at least one layer of metal material is made from new metal material deriving from industrial working.

According to a variant of the present invention, the multi-layer material comprises at least a covering sheet, such as a sheet of acetate material or suchlike, applied on its external surfaces. This allows to define a covering layer so as to confer a desired aesthetic appearance: it can for example be colored, opaque or partly transparent.

The present invention also concerns an article made using the multi-layer material as described above, such as for example a furnishing ornament, an accessory for the home, a gadget, a personal accessory such as for example frames for glasses, bracelets, straps for watches or suchlike.

The method for the production of the multi-layer material according to the present invention comprises at least the following steps:

preparing a plurality of wood-based sheets;
interposing at least a layer of metal material between two wood-based sheets;
interposing appropriate adhesive materials between adjacent wood-based sheets and between the layer of metal material and the adjacent wood-based sheets;
exerting an adequate pressure on the wood-based sheets and on the layer of metal material thus associated so as to obtain their reciprocal gluing.

According to a variant, the method provides a step of disposing two of said layers of metal material, of which a first is interposed between at least two wood-based sheets and a second layer in turn interposed between at least two wood-based sheets.

According to another variant, the method provides a step of disposing two of said layers of metal material, of which a first is interposed between at least two wood-based sheets and a second layer applied externally to one of said wood-based sheets.

The invention provides to dispose one or more internal wood-based sheets with respect to other external wood-based sheets. At least one of the internal wood-based sheets has a shorter length than the length of possible adjacent internal wood-based sheets and than the external wood-based sheets, so as to determine a corresponding variation in thickness of the multi-layer material.

According to a variant of the present invention, at least one layer of metal material is made with a shorter length than the length of the adjacent wood-based sheets, so as to determine a corresponding variation in thickness of the multi-layer material.

It also comes within the spirit of the present invention to provide, inside the multi-layer material, a layer of plastic or acetate material which is made with a smaller linear development with respect to the linear development of the wood-based sheets or at least a metal layer adjacent thereto, and with a progressive variation in thickness so as to determine a corresponding variation in thickness of the multi-layer material.

According to the invention, the entity and duration of the compression to which the sheets and the layers of multi-layer material are subjected are correlated to one or more parameters, such as for example: thickness of the individual sheets and layers, overall thickness of the multi-layer material to be obtained, composition of the sheets, type of adhesive material used.

According to a variant, the method comprises another finishing step, for example polishing or varnishing, of the sheets or the external layers.

In a preferential solution of the invention, the layers of metal material are obtained directly by cutting and/or flattening of tin or aluminum containers of suitable sizes.

In another solution the layers of metal material are obtained from strips or rolls of new metal material.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
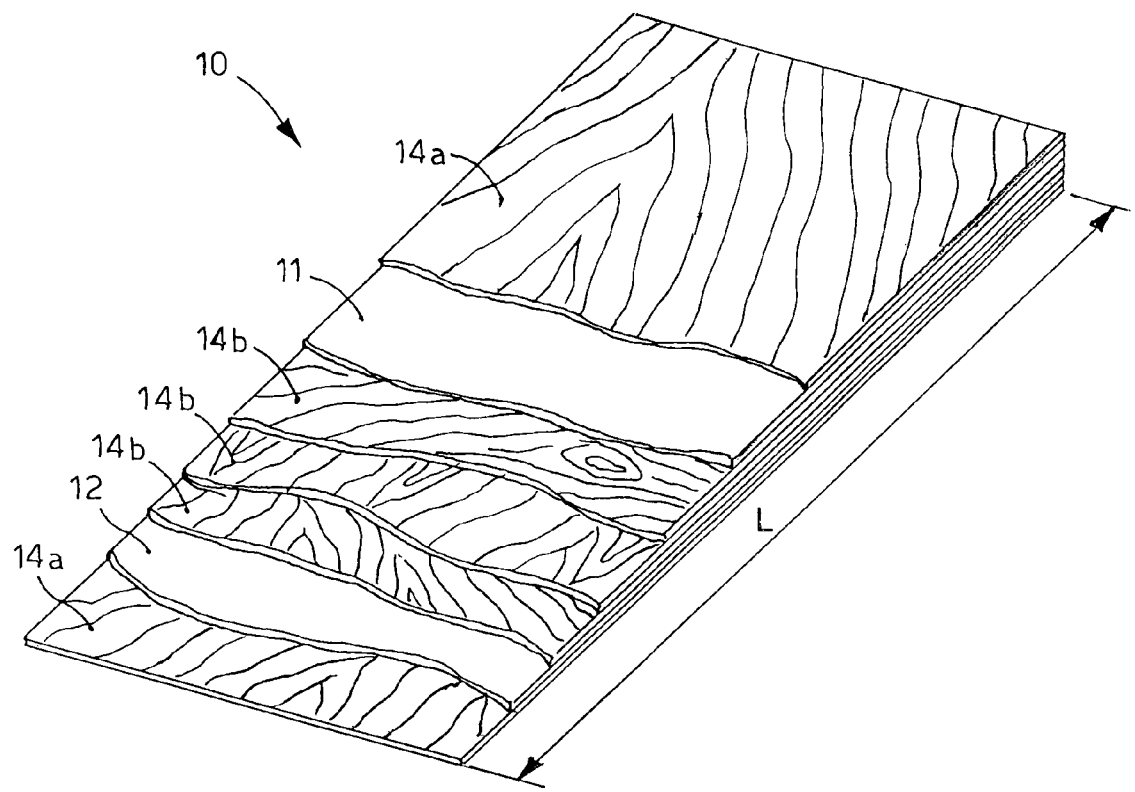
FIG. 1 is a three-dimensional view of a partial section of the multi-layer material according to the present invention.
Figure 2:
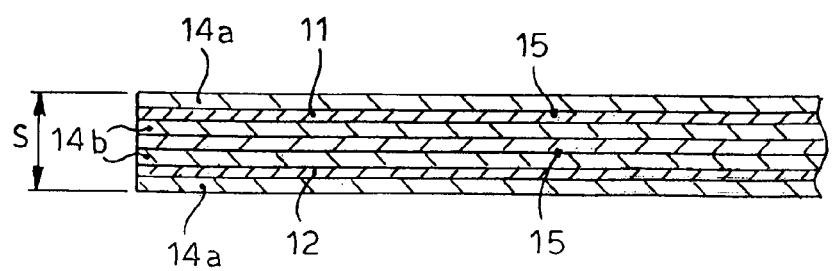
FIG. 2 is a cross section of the multi-layer material in FIG. 1.

With reference to the attached drawings, the number 10 denotes a multi-layer material according to the present invention, which comprises a first layer 11 and a second layer 12, both made of metal material, for example aluminum. The multi-layer material also comprises a plurality of wood sheets 14, in this case five, as indicated in FIGS. 1 and 2, made to adhere reciprocally by means of an adhesive material 15. The sheets 14 comprise respectively external sheets 14a and internal sheets 14b, 114b. The first layer 11, the second layer 12 and the sheets 14 are disposed overlapping and glued to each other so as to define a sandwich configuration.

In particular, both the first metal layer 11 and the second metal layer 12 are interposed between a relative external wood sheet 14a and an internal wood sheet 14b so that the above sandwich configuration has visible surfaces made of wood.

The presence of metal layers disposed inside the layers of wood 14 allows to improve the deformability and elasticity of the multi-layer material 10 according to the invention, so that it can be subjected to suitable bending processes in order to make objects with curvilinear forms, for example gadgets or objects for personal use.

In one form of embodiment, the internal wood sheets 14b, 114b are disposed so that their fibers or grains are disposed transversely to the fibers or grains of an adjacent sheet 14b, 114b.

In another form of embodiment, the wood sheets 14b, 114b are disposed so that their fibers or grains are disposed substantially parallel.

According to another form of embodiment, the sheets 14b, 114b can be grouped together in blocks of sheets, in each block of which the sheets 14b and 114b are disposed with their fibers or grains substantially parallel. The blocks are then disposed so that the fibers or grains of the respective sheets 14b, 114b are disposed transverse to the fibers of the sheets 14b, 114b of an adjacent block.

It is understood that the disposition of the fibers or grains of the sheets can be achieved differently from above, depending on the type of wood-based sheet or its specific properties. For example, the reciprocal disposition of the fibers of the sheets 14 or the blocks of sheets 14 can vary depending on the specific wood used or the cut in the trunk with which the sheets 14 were made.

The sheets 14 have a thickness comprised between 0.4 mm and 0.6 mm. One form of embodiment provides a thickness of about 0.5 mm. The number and thickness of the sheets 14 can vary depending on the intended use of the multi-layer material 10.

The first metal layer 11 and the second metal layer 12 have a thickness comprised between 0.1 mm and 0.3 mm. One form of embodiment provides that the thickness is 0.2 mm.

In some forms of embodiment the first metal layer 11 and the second metal layer 12 are made of recycled material deriving from tin or aluminum containers, such as tins, cans or suchlike.

In another form of embodiment the first metal layer 11 and the second metal layer 12 are made from strips or rolls of industrially produced metal material.

The adhesive materials 15 used to glue the sheets 14 to each other, and to glue the sheets 14 and first metal layer 11 and the second metal layer 12, can be of any suitable type, such as, to give an example, acrylic, ureic, polyurethane or melamine glues or suchlike.

The multi-layer material 10 according to the present invention can be made in a substantially planar configuration, as shown in FIGS. 1 and 2, and is then subjected to further working, for example bending, so as to conform a portion of the multi-layer material 10 in an intermediate or final configuration.

Figure 3:
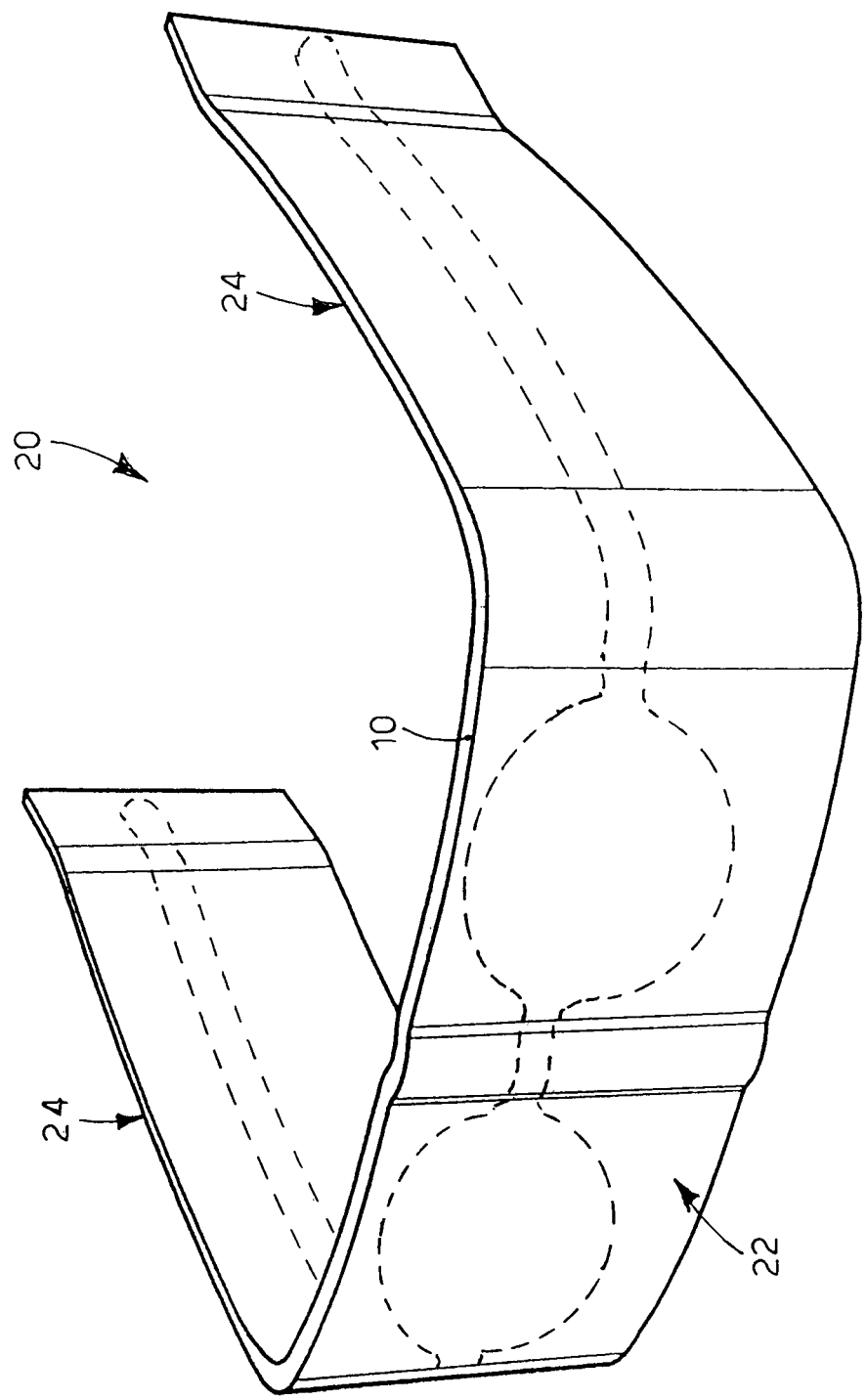
FIG. 3 is a perspective view of the multi-layer material according to the present invention in a predetermined curvilinear conformation.
Figure 4:
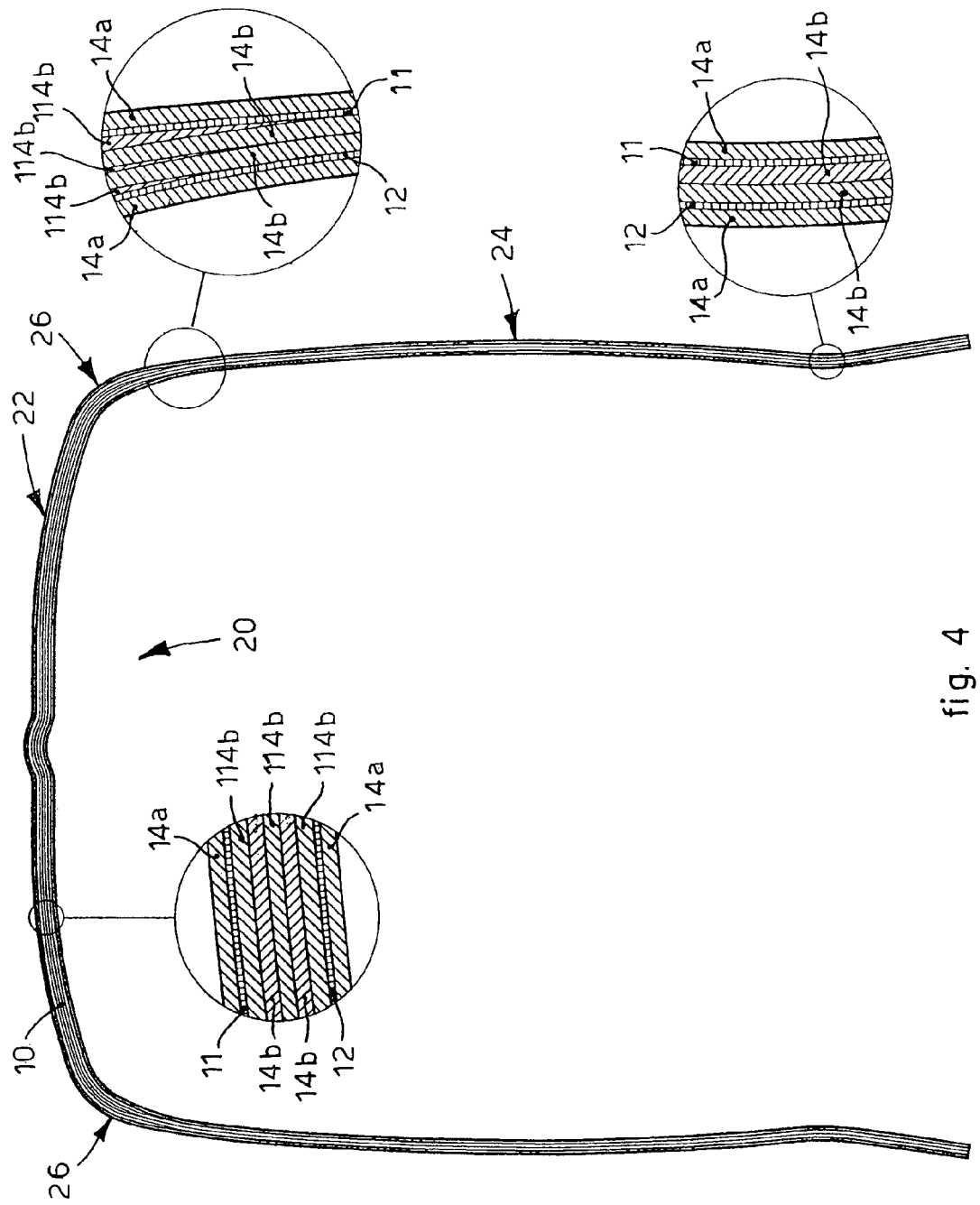
FIG. 4 is a view from above of FIG. 3.

In fact, with reference to FIGS. 3 and 4, the multi-layer material 10 is shaped to make a curvilinear pre-form 20, having a transverse profile that defines in this case the shape of a pair of glasses, indicated by a line of dashes in FIG. 3, and in which the layers of material are disposed to follow the curvilinear development of the pre-form 20 itself.

The pre-form 20 will be worked later, in a substantially known manner, in order to obtain the final object, cutting it so as to define in this case the frames, made in a single piece.

In some forms of embodiment, the pre-form 20 comprises a front portion 22, corresponding to the front piece of the frames, two lateral portions 24, transverse with respect to the front portion 22, and corresponding to the arms of the frames, and having a desired partly curved longitudinal development. The pre-form 20 also comprises two connection portions 26 corresponding to the lug of the frames.

In the case shown here, the pre-form 20 is made starting from a block of multi-layer material 10 similar to that shown in FIG. 1, made so as to have a variable overall thickness. In fact, at least one or more internal sheets 114b (FIG. 4) have a shorter length than that of the adjacent sheets 14b, that is, than the length L of the block of multi-layer material 10. Furthermore, at the ends, in the direction of the length of the material 10, the wood sheets 114b have a cone shape, that is, a taper or progressive and gradual reduction in thickness.

The cone shape determines a cancellation of the relative sheet in a position upstream of the ends of the other adjacent sheets, in this way defining corresponding reductions in thickness of the multi-layer material 10. This allows to modify the thickness of the multi-layer material 10 depending on the different portions and curvatures that are to be obtained in the object in its final form.

In the example shown in FIG. 4, the multi-layer material 10 comprises five internal wood sheets 14b, 114b, two external wood sheets 14a, the first metal layer 11 and the second metal layer 12, each interposed respectively between the external layers 14a and the internal layers 14b, 114b, as shown in an enlargement relating to the front portion 22 which has a greater thickness.

Three internal wood sheets 114b have a progressive reduction in thickness toward their ends, localized substantially in correspondence with the connection portions 26 as shown in the relative enlargement.

This therefore leads to a corresponding gradual reduction in the thickness of the multi-layer material 10, that is, of the pre-form 20, in proximity to its lateral portions 24 from which, in some preferential forms of embodiment, the arms of the frames will be obtained. Indeed, as shown in the relative enlargement, in correspondence with the lateral portions 24 of the pre-form 20, the multi-layer material 10 has a lesser thickness than the front portion 22, since it only comprises two external sheets 14a, two internal sheets 14b and, interposed, the first 11 and the second metal layer 12.

It is understood that there can be a bigger number of cone shaped sheets so as to have, in correspondence with the lateral portions 24 or more generally in the less thick portions, a single internal sheet 14b or more than two internal sheets 14b.

In some forms of embodiment the multi-layer material can comprise one or two covering sheets, for example made of acetate material or suchlike, applied on its external surfaces. In one form of embodiment the acetate sheets can have a thickness comprised between 0.2 mm and 2 mm. In another form of embodiment the covering sheets are at least partly transparent. In another form of embodiment the sheets of acetate material are opaque.

The multi-layer material 10 according to the present invention is made by means of an extremely quick and easy method as described hereafter.

Firstly the sheets 14 are put one on top of the other, interposing between them the first metal layer 11 and the second metal layer 12, so that a sheet of wood material 14 is always disposed toward the outside. Between the wood sheets 14 and the first 11 and the second metal layer 12 an adequate amount of adhesive material 15 is deposited, according to needs.

The reciprocal disposition of the sheets 14 can be achieved as described above, so that the fibers or grains of adjacent sheets are for example substantially parallel or transverse or according to combinations with blocks of adjacent sheets with transverse fibers and blocks of sheets with parallel grains.

The adhesive material 15 used to apply the first 11 and the second metal layer 12 can be the same as that interposed between the sheets 14, or a different type of glue.

The sandwich thus obtained is subjected, by means of a press of a substantially conventional type, for example a hydraulic press of the static type, to a suitable pressure and for a desired period of time so as to glue the sheets 14 to each other and to the first 11 and second metal layer 12.

The entity and duration of the pressure can vary depending on different factors, such as for example the composition and/or thickness of the sheets 14 and the metal layers 11 and 12, the overall thickness "S" of the multi-layer material 10 and/or the type of glue used.

The gluing operation is performed hot, heating the sandwich to a temperature of 60-70° C., and subjecting it to a pressure comprised between 2 and 10 bar, for a period comprised between 5 and 10 minutes approximately.

According to a variant, for the gluing operation a polyurethane adhesive material 15 is used, of the mono-component or bi-component type, and the gluing pressure is exerted at ambient temperature for about 15-45 minutes.

The use of polyurethane adhesive material 15 allows to transfer its own elasticity to the sheets 14 once assembled in the sandwich structure. In fact, the polyurethane adhesive material 15 during the hot gluing step passes through the sheets 14 and allows to increase the elasticity of the multi-layer material 10.

In addition, the polyurethane adhesive material 15 is subjected to an irreversible polymerization, contrary to what happens with vinyl type glues.

Finally, the multi-layer material 10 thus obtained can be subjected to finishing treatments of the external sheets 14a, such as varnishing or polishing.

The invention claimed is:

1. A multi-layer material comprising:
   a plurality of wood-based sheets, wherein the plurality of wood-based sheets include one or more internal wood-based sheets and one or more external wood-based sheets;
   a layer of metal material interposed between at least two wood-based sheets among the plurality of wood based sheets;
   wherein at least one of the internal wood-based sheets has a progressive reduction of thickness towards its ends and terminates in a position upstream with respect to the ends of adjacent internal wood-based sheets and external wood-based sheets, and
   wherein a shorter length of the at least one of the internal wood-based sheet determines the progressive reduction and a corresponding variation of an overall thickness in the multi-layer material.

2. The multi-layer material as in claim 1, wherein the layer of metal material includes a first layer interposed between the at least two wood-based sheets and a second layer interposed between at least two different wood-based sheets.

3. The multi-layer material as in claim 1, wherein the layer of metal material includes a first layer interposed between the at least two wood-based sheets and a second layer applied externally to one of the wood-based sheets.

4. The multi-layer material as in claim 1, wherein at least one layer of metal material has a progressive reduction in thickness towards its ends, so that the internal wood-based sheet ends in a position upstream with respect to at least the ends of the external wood-based sheets, wherein a shorter length of the at least one metal layer determines a progressive and corresponding variation of overall thickness in the multi-layer material.

5. The multi-layer material as in claim 1, wherein at least one of the an internal wood-based sheets includes a plastic or acetate material which has a progressive reduction in thickness towards its ends, so that the internal wood-based sheet ends in a position upstream with respect at least to the ends of the external wood-based sheets, or of at least a metal layer adjacent to it, in which a shorter length of the plastic or acetate material determines a progressive and corresponding variation in overall thickness in the multi-layer material.

6. The multi-layer material as in claim 1, wherein at least one layer of metal material is made of recycled material deriving from tin or aluminum containers.

7. The multi-layer material as in claim 1, wherein at least one layer of metal material is made of new metal material deriving from industrial processing.

8. The multi-layer material as in claim 1, comprising at least a covering sheet applied on at least an external surface.

9. An article, including at least one of a furnishing ornament, an accessory for the house, a gadget or a personal accessory, made by a multi-layer material as in claim 1.

10. A method to make the multi-layer material of claim 1, comprising the steps of:
    disposing a plurality of wood-based sheets;
    interposing at least one layer of metal material between two wood-based sheets;
    interposing suitable adhesive materials between adjacent wood-based sheets and between the metal layer and the adjacent wood-based sheets;
    exerting an adequate pressure on the wood-based sheets and on the layer of metal material thus associated so as to obtain their reciprocal adhesion, wherein the step of disposing a plurality of wood-based sheets provides to dispose at least of said internal wood-based sheets having a progressive reduction in thickness towards its ends, so that the internal wood-based sheet ends in a position upstream with respect to the ends of the adjacent internal wood-based sheets and of the external wood-based sheets, wherein the shorter length of said at least one internal wood-based sheet determines a progressive and corresponding variation in overall thickness in said multi-layer material.

11. The method as in claim 10, wherein it provides a step of disposing two of said layers of metal material, of which a first layer interposed between at least two wood-based sheets and a second layer interposed in its turn between at least two wood-based sheets.

12. The method as in claim 10, wherein it provides a step of disposing two of said layers of metal material, of which a first layer interposed between two wood-based sheets and a second layer applied externally to one of said wood-based sheets.

13. The method as in claim 10, wherein it provides to use at least one layer of metal material having a progressive reduction in thickness towards its ends, so that the internal wood-based sheet ends in a position upstream with respect to the ends of the adjacent internal wood-based sheets and of the external wood-based sheets, wherein the shorter length of said at least one layer of metal material determines a progressive and corresponding variation in overall thickness in said multi-layer material.

14. The method as in claim 10, wherein it provides to use at least a layer made of plastic or acetate material having a progressive reduction in thickness towards its ends, so that the internal wood-based sheet ends in a position upstream with respect to the ends of the adjacent internal wood-based sheets and the external wood-based sheets, wherein the shorter length of said at least one layer of plastic or acetate material determines a progressive and corresponding variation in overall thickness in said multi-layer material.

15. The method as in claim 10, wherein at least one layer of metal material is obtained directly by cutting and/or flattening of tin or aluminum containers of suitable sizes.

* * * * *